United States Patent

[11] 3,631,777

[72] Inventor Kunio Mita
 Kita-Adachi-gun, Saitama-ken, Japan
[21] Appl. No. 845,941
[22] Filed July 24, 1969
[45] Patented Jan. 4, 1972
[73] Assignee Asahi Kogaku Kogyo Kabushiki Kaisha
 Tokyo, Japan
[32] Priority July 30, 1968
[33] Japan
[31] 43/65243

[54] AUTOMATIC CAMERA SHUTTER
 3 Claims, 2 Drawing Figs.

[52] U.S. Cl............................................... 95/10 CT
[51] Int. Cl............................................... G03b 7/08
[50] Field of Search.................................... 95/10 C

[56] References Cited
 UNITED STATES PATENTS

| | | | |
|---|---|---|---|
| 3,227,057 | 1/1966 | Stimson et al. | 95/10 C |
| 3,286,610 | 11/1966 | Fahlenberg | 95/10 C |
| 3,502,010 | 3/1970 | Kennel | 95/10 C |
| 3,502,011 | 3/1970 | Rentschler et al. | 95/10 C |

*Primary Examiner*—Samuel S. Matthews
*Assistant Examiner*—Michael L. Gellner
*Attorney*—Stanley Wolder

ABSTRACT: A light-controlled automatic camera shutter comprises a timing circuit including a series connected photoconductor and capacitor, a solid-state switch controlled by the capacitor charge and a network for measuring the photoconductor resistance including a meter for preindicating the exposure time. Normally open first and third and closed second switches are concurrently actuatable, the resistance measuring network being connected to a battery through the first switch, a shutter closure release solenoid being connected to the battery through the solid-state switch output and the first and second switches in series, and the third switch connecting the meter in the resistance measuring network. The first switch or a fourth switch is actuated by the initiation of the shutter opening to energize the solenoid solid-state switch network.

INVENTOR
KUNIO MITA
BY Stanley Wolder
ATTORNEY

AUTOMATIC CAMERA SHUTTER

BACKGROUND OF THE INVENTION

The present invention relates generally to improvements in light-controlled automatic camera shutters and it relates particularly to an improved light-controlled shutter network which provides a preindication of the shutter exposure time.

In employing cameras with light-controlled automatic shutters it is highly desirable to determine the shutter exposure time before release of the shutter since such exposure time may be too long for hand holding the camera during exposure or the diaphragm may admit more light than the highest shutter speed can properly handle. Many arrangements have been proposed and employed for providing a visual preindication by means of a current meter or lamp of the shutter exposure time but these possess numerous drawbacks and disadvantages. In these arrangements the indicator network is energized by a depression of the shutter release button to a point before the shutter release is effected.

The optimum actuation of the shutter release button requires a sensitive response and no diversion in the operation thereof. However, such conditions are absent in the aforesaid arrangements since a long operational stroke or increased force is required to operate the shutter release button due to the operation of the accompanying switching sequence. From the point of view of human engineering these systems are inconvenient, awkward and undesirable.

In arrangements for the predetermination of the exposure time where the circuit is closed by the operation of the shutter release button, power is wastefully consumed for such predetermination of exposure time that is not necessarily required in every photographing sequence. There have been employed electronic shutter circuits which are closed only during the photographing sequence to energize an electromagnet, the elements included in said electronic shutter circuit by which electric power is most highly consumed. But with a switching mechanism so arranged that the magnet is energized by the operation of the shutter release button, an inconvenience occurs in photographing operation as previously described and with another switching mechanism so arranged to be automatically operated by an operative member acting until shutter opening starts, disadvantages occur such as a time restriction of the switching operation and a space-restriction for the installation of a switching mechanism, or chattering of switching mechanism due to the sudden movement of the operative member.

SUMMARY OF THE INVENTION

It is a principal object of the present invention to provide an improved light-controlled automatic camera shutter mechanism.

Another object of the present invention is to provide an improved light-controlled automatic camera shutter mechanism which affords a preindication of the shutter exposure time.

Still another object of the present invention is to provide in a light-controlled automatic shutter control network an independently actuatable network which affords a preindication of shutter exposure time.

A further object of the present invention is to provide a mechanism of the above nature characterized by a low-current consumption, ease and convenience of use, noninterference with the shutter release operation and a high reliability and versatility.

The above and other objects of the present invention will become apparent from a reading of the following description taken in conjunction with the accompanying drawing which illustrates preferred embodiments thereof.

In a sense the present invention contemplates the provision of a camera shutter control system comprising a timing network including a light-exposable photosensitive element, a shutter closure release means including a solid-state switch network responsive to said timing network and a shutter closure release actuating member responsive to the state of said solid-state switch, a first switch means responsive to the camera shutter release actuating member for energizing said shutter release means, and indicating means responsive to the light incident on said photosensitive element and including a manually operable second switch means for concurrently closing the indicating means energizing circuit and opening the energizing circuit of said shutter closure release means.

The preferred form of the improved mechanism includes a solid-state switch network including a resistance-measuring section. A timing network includes a photoconductor connected to the resistance measuring section input, and a series-connected capacitor connected to the switch circuit control input. Ganged first and third normally open and second normally closed switches are provided. A battery has one terminal grounded and its other terminal connected through the first switch to a hotline which in turn is connected to the timing circuit, the resistance-measuring section energizing terminal and through the series-connected second switch, a shutter closure release solenoid and the solid-state switch output to ground. The ganged switches are actuatable by an externally accessible camera-mounted member and the first switch is independently actuatable upon initiation of the shutter-opening sequence such as by depression of the shutter release button. A separate shutter release button actuated switch may be substituted for the first switch to connect the solenoid to the battery.

With the improved mechanism the exposure indicating network is energized independently of the shutter control network in a manner to minimize electric power consumption and optimize the manual shutter release operation.

DESCRIPTION OF THE PREFERRED EMBODIMENTS

Figure 1:
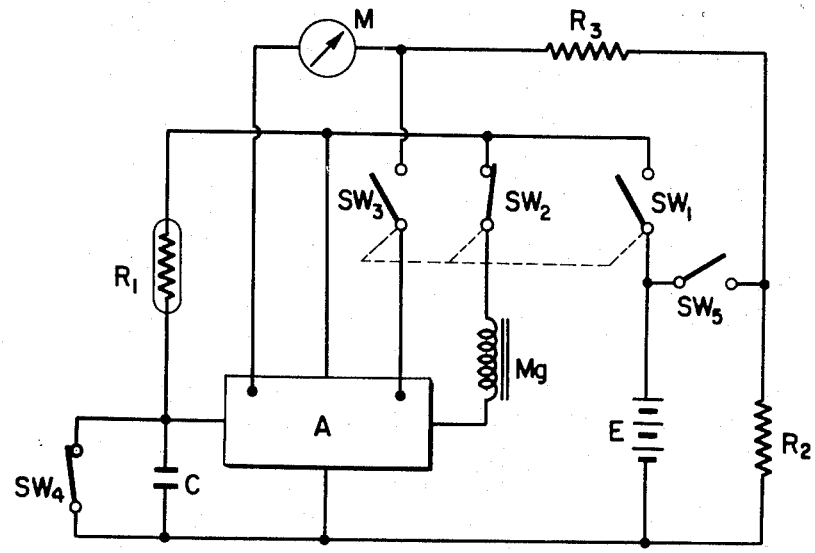
FIG. 1 is a circuit diagram of a preferred embodiment of the present invention.

Referring now to the drawing and particularly FIG. 1 thereof which illustrates a preferred embodiment of the present invention, the reference letter A generally designates an amplifier and switch network of known construction which in combination with an ammeter M forms a resistance-measuring ohmmeter, and whose switch output is controlled by the charge on a timing capacitor C connected to the control input of network A. That is, network A includes a resistance-measuring or ohmmeter section having a first input across which a resistor to be measured is connected and a first output to which a current meter is connected for providing an indication of the resistance value, and a switch section having a second input to which a switch control signal may be applied and a second output whose current output responds to the control input in the manner of a solid-state switch. The network A and the individual sections thereof are of conventional and well known construction. Timing capacitor C is shunted by a normally closed switch $SW_4$ which is mechanically coupled to the camera shutter to be opened with the opening of the shutter.

A photoconductor $R_1$ is connected in series with a normally open switch $SW_1$ and an energizing battery E across capacitor C and is connected to the ohmmeter resistance measuring or first input of network A. The meter M is connected through a normally open switch $SW_3$ to the ohmmeter or first output of network A and through the series-connected resistors $R_2$ and $R_3$ to the grounded terminal of battery E. The controlled switch or second output terminal of network A is connected through the winding or solenoid of a shutter closure release retaining electromagnet Mg. in series with a normally closed switch $SW_2$ and switch $SW_1$ to the ungrounded terminal of battery E, said ungrounded terminal being connected through a normally open switch $SW_5$ to the junction of resistors $R_2$ and $R_3$.

The switches $SW_1$, $SW_2$ and $SW_3$ are ganged to be concurrently operated by an externally accessible check button mounted on the camera and the switch $SW_1$ may be closed independently of switches $SW_2$ and $SW_3$ and is mechanically coupled to the camera shutter release button.

Figure 2:
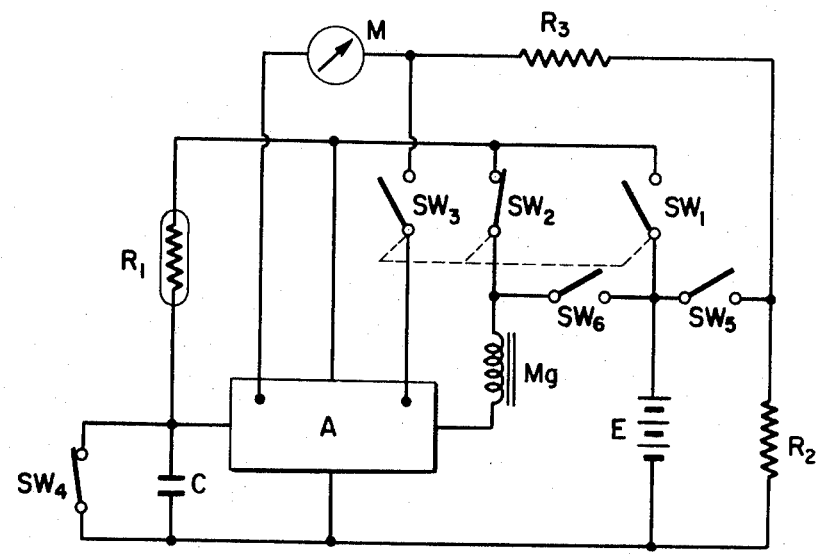
FIG. 2 is a circuit diagram of another embodiment thereof.

The embodiment illustrated in FIG. 2 is similar to that shown in FIG. 1 except that a normally open switch $SW_6$ connects the ungrounded terminal of battery E through electromagnet Mg to the switch output terminal of network A. The switch $SW_6$ is closed with the depression of the shutter release button by any suitable coupling and the switch $SW_1$ is operated only concurrently with switches $SW_2$ and $SW_3$. In all other respects the structures shown in FIGS. 1 and 2 are the same.

Considering now the operation of the networks described above, in order to check the exposure time under the incident light conditions, the check button is depressed to close switches $SW_1$ and $SW_3$ and open switch $SW_2$. The ohmmeter section is thus energized by closed switch $SW_1$ and the meter M connected through $S_3$ provides an incidation responsive to the resistance of photoconductor $R_1$ and other parameters associated with network A relating to the accompanying photographing conditions and hence of the automatic exposure time of the shutter. In the shutter time checking state, switch $SW_2$ is open thereby deenergizing the electromagnet Mg and minimizing the consumption of current. Upon release of the check button, switches $SW_1$, $SW_2$ and $SW_3$ return to their initial positions shown in the drawings.

To effect the release and automatic timing of the shutter, the shutter release button is depressed to close switch $SW_1$ in FIG. 1 or switch $SW_6$ in FIG. 2 to energize the switch network section and electromagnet Mg whereby to retain the shutter closure release member in a locked condition. With the opening of the shutter, switch $SW_4$ is opened, causing capacitor C to charge through photoconductor $R_1$ until a switch triggering voltage is reached at a time which depends on the light incident on photoconductor $R_1$. The switch network is thus actuated to deenergize electromagnet Mg and effect the release of the shutter closure member and complete the exposure sequence.

The voltage of battery E may be checked merely by closing switch $SW_5$ whereby to complete the circuit of meter M to battery E through resistor $R_3$ and to shunt battery E by resistor $R_2$ so that a reading is provided by meter M indicative of the state of battery E. It should be noted that another electrically actuated indicating device, such as a lamp or the like, may be substituted for meter M.

According to the improved mechanism as explained in the foregoing description, the switching operation in the exposure time confirmation circuit in the electric shutter is accomplished by an operating member independent of the member for effecting the shutter release so that the shutter operation is free from any disturbance and the switching mechanism is highly simplified. Furthermore, it is not necessary to energize the exposure time confirmation circuit for every photographing sequence, so that any wasteful consumption of electric power is saved and consequently the life of battery is prolonged.

While there have been described and illustrated preferred embodiments of the present invention it is apparent that numerous alterations, omissions and additions may be made without departing from the spirit thereof.

What is claimed is:

1. A camera shutter control system comprising an electrical network including a resistance-measuring section having a first input to which a resistance to be measured is connected and a first output providing a current responsive to the resistance connected to said first input and a switch section having a second switch control input and a second switch control output providing a current responsive to the signal to said second input, a timing network including in series connection a timing capacitor connected across said first input and a light exposable photoconductor connected across said second input, a current responsive indicating device, a shutter closure release electromagnet, first and second resistors, a battery having first and second terminals, first, third and fifth normally open switches and second and fourth normally closed switches, said indicating device being connected through said third switch across said network first output, said network being connected through said first switch across said battery for energizing said network, said electromagnet and said first and second switches and said battery being connected in series across said network second output, said indicating device and said first and second resistors being connected in series to said battery first terminal, said first resistor being connected across said battery through said fifth switch, said fourth switch being connected across said capacitor and said first, second and third switch being simultaneously operable.

2. The camera shutter control system of claim 1 including a normally open sixth switch connected between the junction of said solenoid and second switch and the junction of said battery and first switch.

3. The camera shutter control mechanism of claim 1 wherein said second switch is selectively independently actuatable.

* * * * *